(12) United States Patent
Glennie et al.

(10) Patent No.: US 8,181,437 B2
(45) Date of Patent: May 22, 2012

(54) CABLE ASSEMBLY WITH ANCHOR

(75) Inventors: David Malcolm Glennie, Singapore (SG); Lew Kah Hoo, Singapore (SG)

(73) Assignee: Franklin Offshore International Pte. Ltd., Singapore (SG)

( * ) Notice: Subject to any disclaimer, the term of this patent is extended or adjusted under 35 U.S.C. 154(b) by 285 days.

(21) Appl. No.: 12/623,792

(22) Filed: Nov. 23, 2009

(65) Prior Publication Data

US 2010/0132328 A1 Jun. 3, 2010

(30) Foreign Application Priority Data

Dec. 2, 2008 (SG) ................................ 200808928-6

(51) Int. Cl.
*D01H 15/00* (2006.01)
(52) U.S. Cl. ............................................. 57/22; 57/200
(58) Field of Classification Search .............. 57/22, 200, 57/212, 210
See application file for complete search history.

(56) References Cited

U.S. PATENT DOCUMENTS 3,032,846 A * 5/1962 Stanton et al. ................. 403/212
4,733,442 A * 3/1988 Asai .............................. 24/580.1

OTHER PUBLICATIONS

"Specification for Wire Rope"; ISO 10425:2003; ANSI/API Specification 9A; 25th Edition; Feb. 2004; 68 pp.

* cited by examiner

*Primary Examiner* — Shaun R Hurley
(74) *Attorney, Agent, or Firm* — Wells St. John P.S.

(57) ABSTRACT

A cable assembly comprises a cable having a main body, strands, a tail and a first cable end, an anchor, and a sleeve having a bore, a first end and a second end. The first end is positioned generally adjacent the anchor, the second end is positioned remote from the anchor, and the cable end is positioned in the bore. A cured adhesive is positioned in the bore, binding the sleeve to the cable, along with a rope insert which is positioned at least partially in the bore, wherein the cured adhesive holds the at least one rope insert in a fixed position with respect to the sleeve.

15 Claims, 8 Drawing Sheets

CABLE ASSEMBLY WITH ANCHOR

CROSS-REFERENCE TO RELATED APPLICATION

This application claims priority to Singapore Patent Application No. 200808928-6, which was filed Dec. 2, 2008, and all the teachings and disclosure of the Singapore Patent Application No. 200808928-6 is incorporated herein by reference.

FIELD OF THE INVENTION

The present invention relates generally to a cable assembly with an anchor, and more particularly to a cable assembly where the anchor is a flemish eye.

BACKGROUND OF THE INVENTION

Cable assemblies with anchors are used for a wide variety of applications, including heavy duty offshore connecting and lifting. Cable assemblies used in such applications are often constructed with what is referred to as a sling with a flemish eye. With a flemish eye, a loop is formed at the end of a cable by dividing strands of the cable and wrapping them over each other. The ends of the cable are secured together using a sleeve. In some instances an adhesive may be applied in the sleeve to secure the cable ends to a main body of the cable. Such known flemish eye cable assemblies have found extensive use in nautical and offshore applications.

However, in some applications, as the adhesive is cured it has been found that the adhesive does not provide sufficient bonding between the sleeve and the cable. This can lead to several problems, including visible cracks appearing on a surface of the adhesive. It would be desirable to provide a cable assembly where this is not a concern.

SUMMARY OF THE INVENTION

In accordance with a first aspect, a cable assembly comprises a cable having a main body, strands, a tail and a first cable end, an anchor, and a sleeve having a bore, a first end and a second end. The first end is positioned generally adjacent the anchor, the second end is positioned remote from the anchor, and the cable end is positioned in the bore. A cured adhesive is positioned in the bore, binding the sleeve to the cable, along with a rope insert positioned at least partially within the bore, wherein the cured adhesive holds the rope inserts in a fixed position with respect to the sleeve.

From the foregoing disclosure and the following more detailed description of various preferred embodiments it will be apparent to those skilled in the art that the present invention provides a significant advance in the technology of cable assemblies. Particularly significant in this regard is the potential the invention affords for providing a high quality cable assembly especially for use in offshore and nautical applications. Additional features and advantages of various preferred embodiments will be better understood in view of the detailed description provided below.

It should be understood that the appended drawings are not necessarily to scale, presenting a somewhat simplified representation of various preferred features illustrative of the basic principles of the invention. The specific design features of the cable assembly as disclosed here, including, for example, the specific dimensions of the sleeve, will be determined in part by the particular intended application and use environment. Certain features of the illustrated embodiments have been enlarged or distorted relative to others to help provide clear understanding. In particular, thin features may be thickened, for example, for clarity of illustration. All references to direction and position, unless otherwise indicated, refer to the orientation illustrated in the drawings.

DETAILED DESCRIPTION OF CERTAIN PREFERRED EMBODIMENTS

It will be apparent to those skilled in the art, that is, to those who have knowledge or experience in this area of technology, that many uses and design variations are possible for the cable assembly disclosed here. The following detailed discussion of various alternative and preferred features and embodiments will illustrate the general principles of the invention with reference to a cable assembly suitable for use in heavy duty offshore applications. Other embodiments suitable for other applications will be apparent to those skilled in the art given the benefit of this disclosure.

Figure 1:
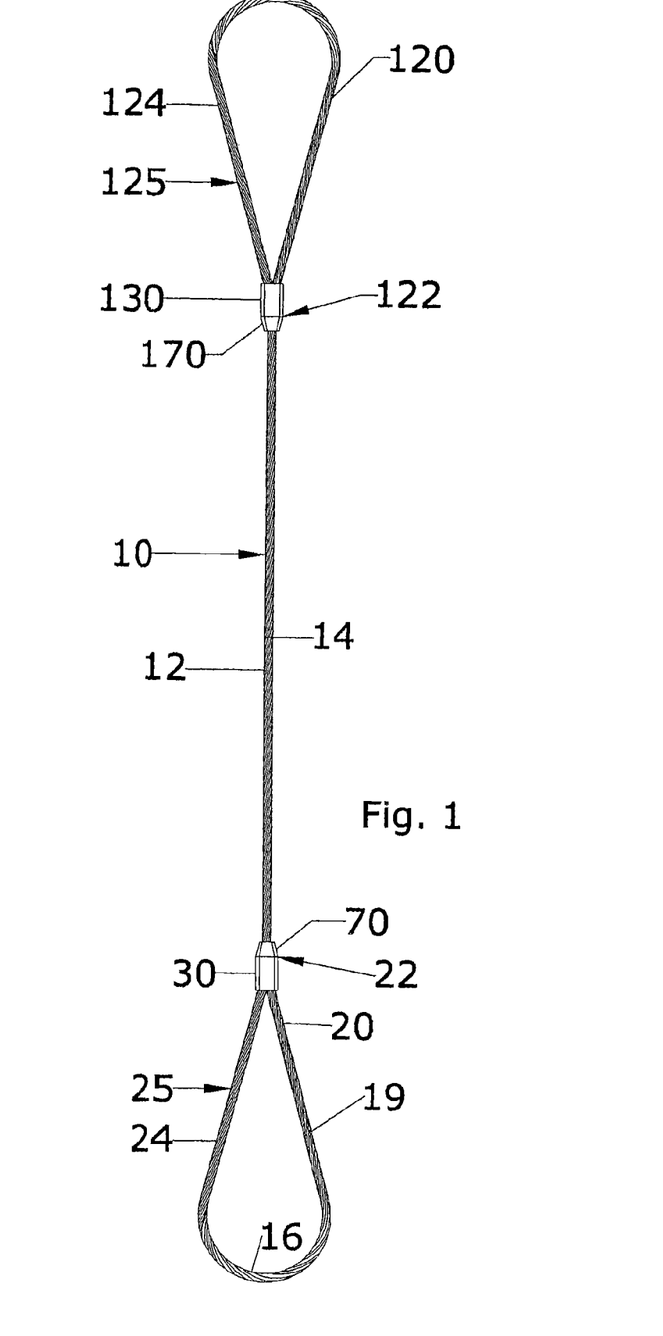
FIG. 1 is a side view of a cable assembly with a flemish eye in accordance with a preferred embodiment.

Turning now to the drawings, FIG. 1 shows a side view of a preferred embodiment of the cable assembly 10. The cable assembly 10 includes a cable 12 having a main body 14. Preferably the cable 12 comprises a core rope 17 (shown in FIGS. 3-5) and outer ropes 19. Each rope preferably comprises a series of strands 16. The construction of the core rope 17 and the outer ropes 19 is preferably in accordance with the standards specified in ISO 10425:2003 API-9A. Each of the strands 16 can comprise steel or another suitable high strength material. Preferably the cable assembly 10 has an anchor 25. The anchor 25 can be formed as a flemish eye 24. Rope 19 of the cable is split into portions at a tail 20 and wrapped over an opposite portion of the rope. The portions are recombined with the main body 14 at a cable end 22 at a sleeve 30. Optionally an end cap 70 may be provided which is useful as an anti-fouling member during use. In a similar manner, the anchor can also comprise a second anchor 125 formed as a second flemish eye 124 at a second tail 120 may be closed off at a second end 122 of the cable 12 using a second sleeve 130 and an optional second end cap 170.

Figure 2:
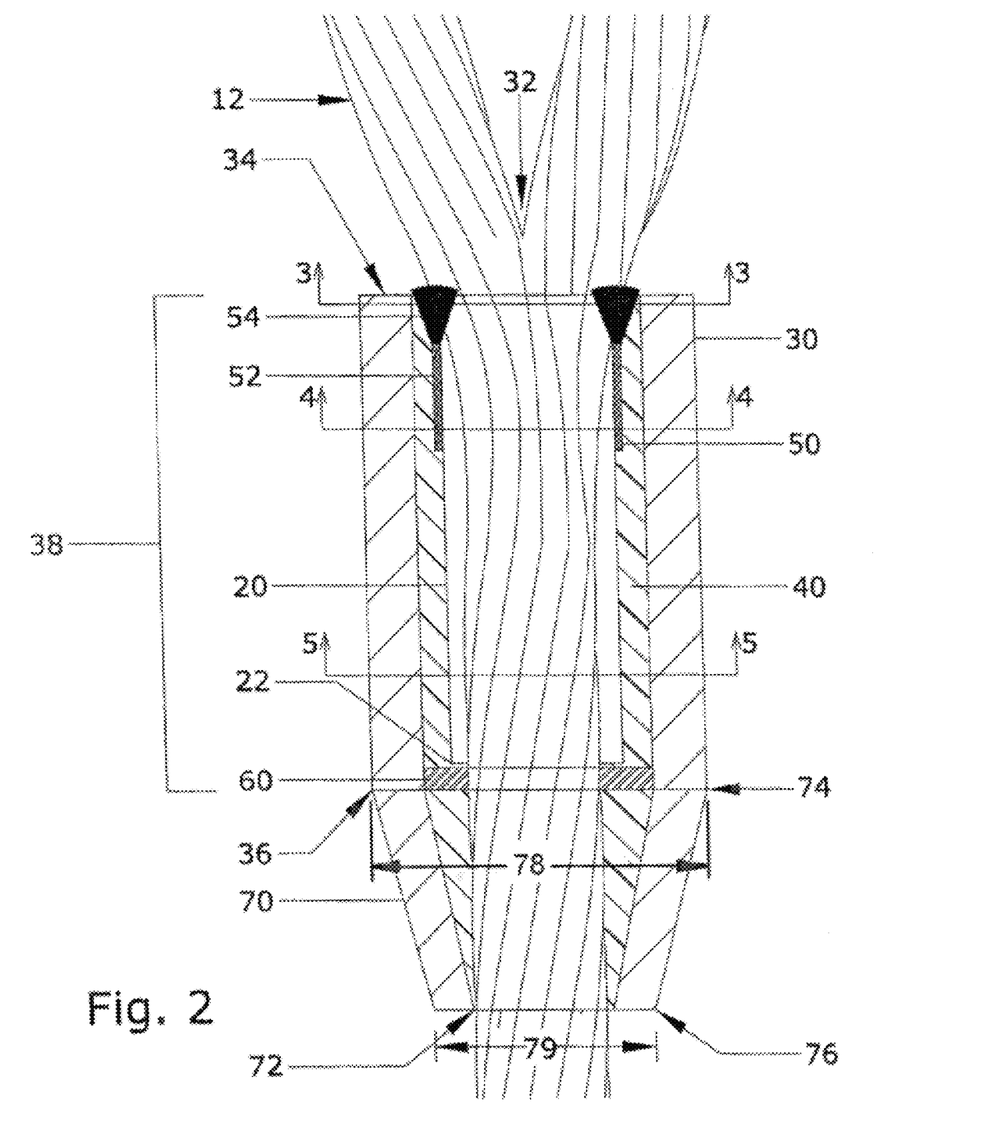
FIG. 2 is a longitudinal cross section view taken through the sleeve showing rope inserts and a positioning ring.

FIG. 2 is a cross section view of an end of flemish eye 24 at the sleeve 30 of FIG. 1 where the strands are recombined with the main body 14. As noted above the flemish eye 24 is formed by dividing strands of the cable at the tail 20, and wrapping or laying the strands over each other. A first end 22 of the cable is secured around the main body of the cable inside a bore 32 of the sleeve 30. Preferably the sleeve 30 circumferentially surrounds a portion of the main body 14 of the cable 12 and a portion of the tail 20. The sleeve 30 has a first end 34 generally adjacent the anchor 25 and a second end 36 positioned more remote from the anchor 25. The tail 20 is preferably distributed or wrapped evenly around the main body 14 of the cable to ensure a uniform load distribution. The sleeve 30 and adhesive 40 cooperate to lock the strands 16 of the cable 12 in place. A positioning ring 60 may be provided which is preferably positioned in the bore 32. The ring 60 may extend circumferentially around the cable 12. The ring 60 acts an alignment agent, centering the cable within the bore 32. The ring 60 also allows the tail and main body 14 to set in the adhesive in a controlled manner during assembly. Preferably the ring is positioned near a second end 36 of the sleeve 30. Both the sleeve and the positioning ring may be made of steel or other suitable high strength material.

The adhesive 40 which is used to help hold the flemish eye 24 in place is preferably a composite resin or a thermosetting resin. A suitable example of an acceptable resin is sold under the name Maklock. During assembly, the adhesive is introduced into the sleeve after the flemish eye is formed and the sleeve is fitted around the cable. The second end 36 of the sleeve is preferably sealed using plasticine or a similar material to prevent leakage. As a further advantageous step, a quantity of the resin, such as between 5 and 10% of the total volume, is preferably mixed and poured into the sleeve after the sleeve is sealed. The adhesive is preferably allowed to harden before a main pour is made to complete and strengthen the seal ensuring that there will be no leakage of the main pour. Once the resin is mixed to a preferred consistency, the resin should be poured immediately into the sleeve to ensure good penetration into interstices (gaps) of the cable. Immediate pouring will ensure that the gelling stage occurs in the sleeve and not in the mixing container. Preferably, the adhesive is poured down the side of the sleeve to allow air to escape.

The cap 70 may preferably be attached to the second end 36 of the sleeve 30 remote from the flemish eye by in any of a number of ways, for example, welded together, with the cable 12 extending through the cap bore 72. The cap may comprise steel or other suitable high strength material. As shown in FIG. 2, the shape of the cap 70 is preferably conical. That is, the first end 74 of the cap has a cross section width 78 greater than a cross section width 79 of the second end 76 of the cap 70. The purpose of the cap is two fold: to provide some extra support for the sleeve to restrict relative movement, and to act as an anti-fouling member when in use. That is, the cap helps guide external elements away from the sleeve, preventing them from catching on the sleeve. This helps to ensure smooth maneuvering of the cable assembly when in use.

Figure 8:
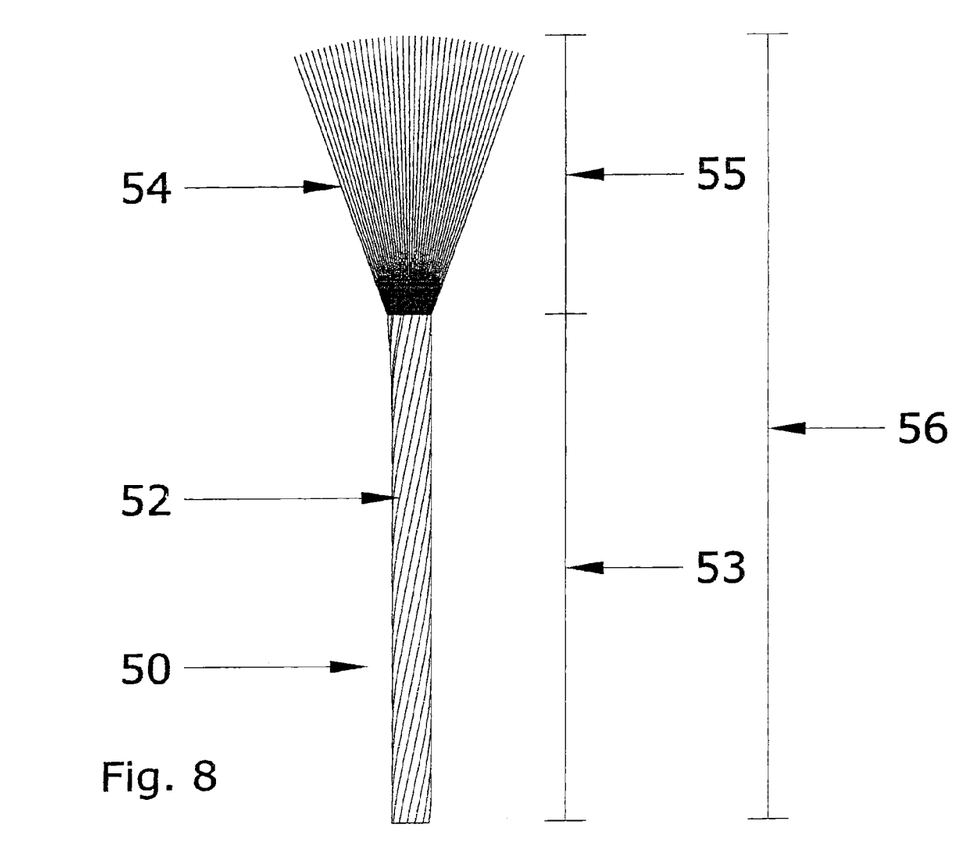
FIG. 8 is a side view of the rope insert.

In accordance with a highly advantageous feature, rope inserts 50 are positioned within the bore 32 of the sleeve 30. The rope inserts 50 preferably comprise a short length of a cable similar to the material used for cable 12. However, the rope inserts 50 may use strands smaller in diameter than the strands 16 of cable 12. The rope inserts are shown in FIG. 2 as positioned within the bore circumferentially around the cable 12 and can preferably have a stem 52 and broom 54. Most preferably, the at least one rope insert extends partially out of the adhesive and even out of the bore of the sleeve. That is, the broom 54 is exposed by a small amount (for example 1 to 2 mm) above the adhesive as shown in FIG. 2. The broom 54 can comprise part of the rope insert which is separated or unwound to increase surface area for the adhesive 40 to bind to. Preferably, the broom 54 is closer to the first end 34 of the sleeve 30 than the stem 52. The broom can comprise part of the rope insert which is separated or unwound to increase surface area for the adhesive 40 to bind to. This increased surface area is highly advantageous, especially with large cable assemblies in that the adhesive has more material to bind to, increasing strength of the cable assembly and helping to reduce surface cracking of the adhesive. FIG. 8 shows an isolated example of a rope insert 50. In accordance with a highly advantageous feature, the sleeve has a length 38 (shown in FIGS. 2 & 6), the rope insert has a length 56 (shown in FIG. 8) which is 35% to 70% of the sleeve length. The ratio of lengths has been to found to be a suitable compromise between increased binding area for the adhesive and cost of the components. Also, preferably the broom has a length 55 and the stem has a length 53 and the stem length is two to three times the broom length.

As noted above, the sleeve has a length 38. In accordance with another highly advantageous feature, it has been determined that a preferred length of sleeve needed to provided proper bond strength to secure the flemish eye is a function of the cable diameter. More particularly, the length of the sleeve preferably at least 3.75 times the cable diameter 13 (shown in FIG. 5.

Figure 3:
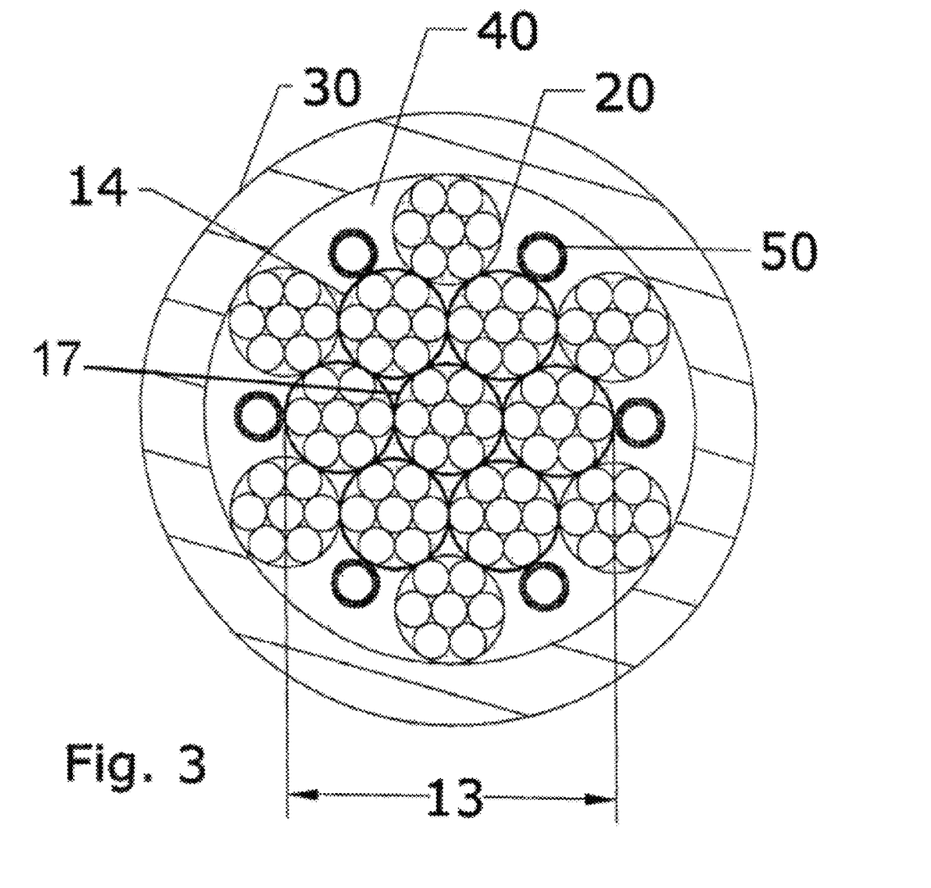
FIG. 3 is a cross section view of the sleeve taken through line 3-3 in FIG. 2.
Figure 4:
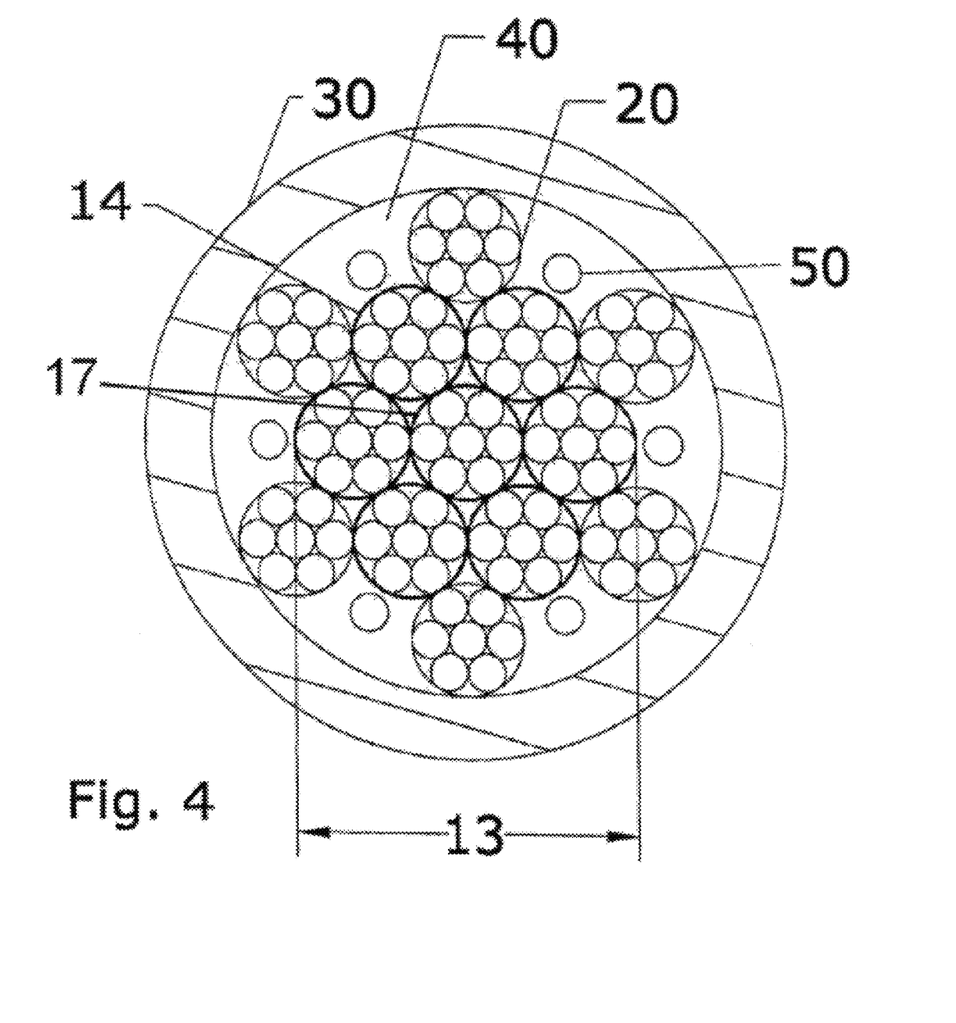
FIG. 4 is a cross section view of the sleeve taken through line 4-4 in FIG. 2.
Figure 5:
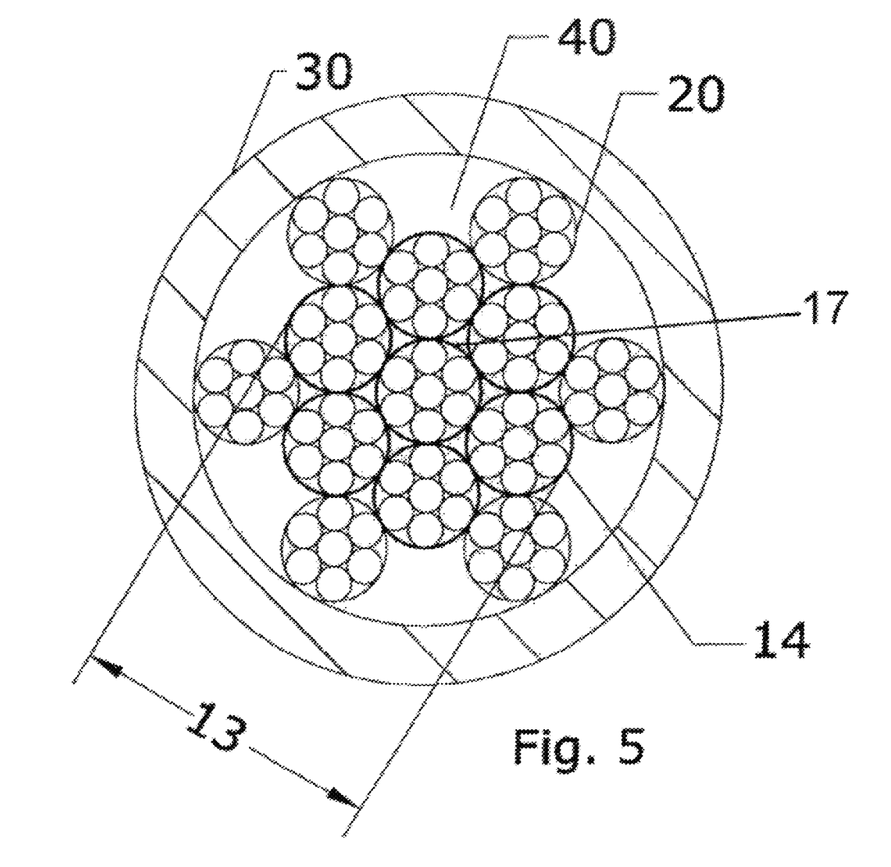
FIG. 5 is a cross section view of the sleeve taken through line 5-5 in FIG. 2.

FIGS. 3-5 show cross section views of the cable in the sleeve 30, taken through FIG. 2. FIG. 3 is taken through the broom 54 of the rope insert 50, FIG. 4 is taken through the stem 52 of the rope insert, and FIG. 5 is taken where the rope insert is not present. In FIGS. 3 and 4, the rope inserts 50 are shown positioned spaced evenly and circumferentially around both the main body 14 of the cable 12 and part of the tail 20, in the adhesive 40. FIG. 4 also shows an option where the tail 20 is partially unwound. FIG. 5 shows the main body 14 having a cable diameter 13 which is used to calculate a preferred length 38 of the sleeve 30, as noted above. In the preferred embodiment shown in the Figs., the cable 12 comprises a core rope 17 having the outer ropes 19 wrapped around the core. Various numbers of outer ropes may be used, depending upon the intended application.

Figure 6:
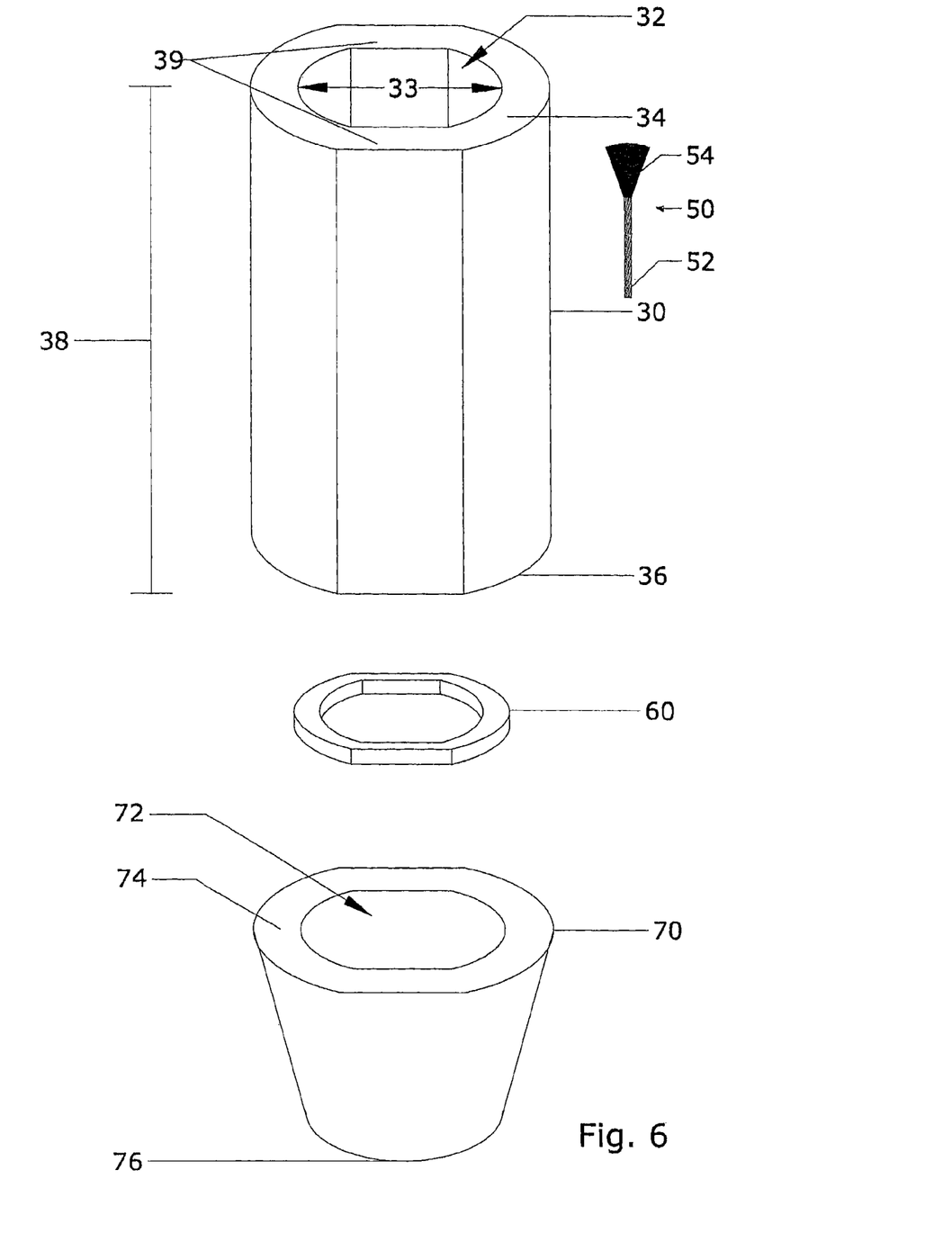
FIG. 6 is an exploded isometric view of the sleeve, positioning ring, rope inserts and end cap.

FIG. 6 shows isometric views of the sleeve 30, positioning ring 60 and cap 70 (and rope inserts 50). In accordance with a preferred embodiment, the sleeve has a pair of flats 39 positioned opposite one another such that the bore 32 has a non-circular cross section. The non-circular bore advantageously helps to resist relative movement of the cable with respect to the sleeve. Also, the flats provide a convenient place for part identification and other markings.

Figure 7A:
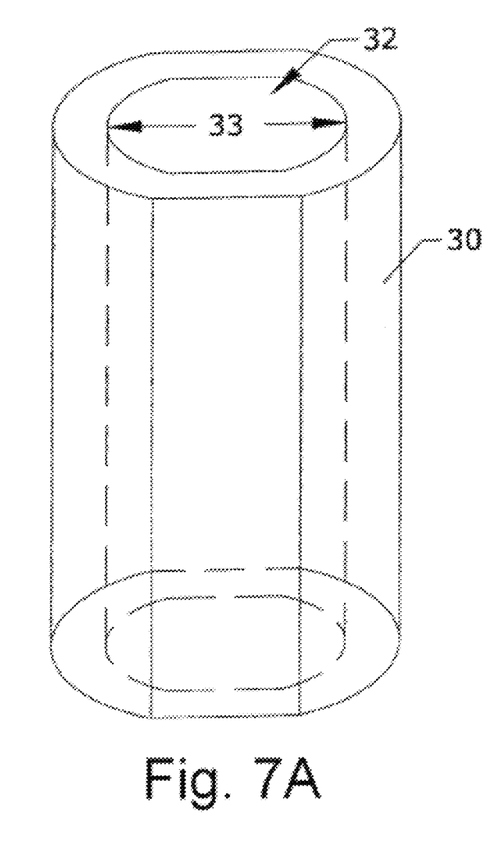
FIG. 7 shows three alternate cross section views of the sleeve with varying bore geometries.
Figure 7B:
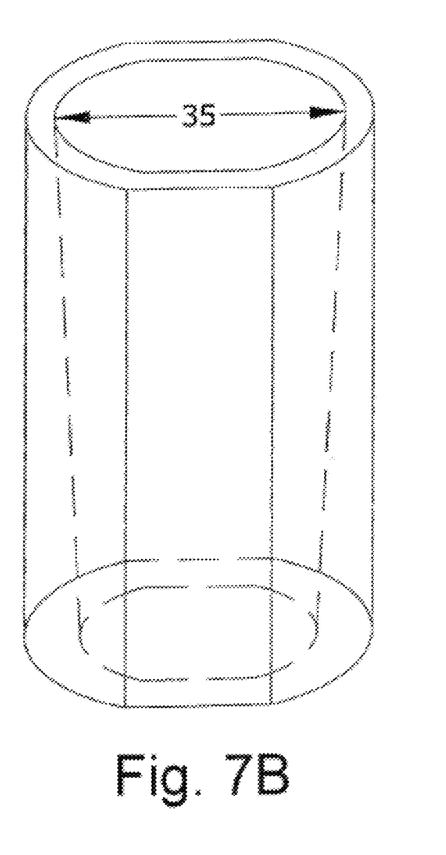
Figure 7C:
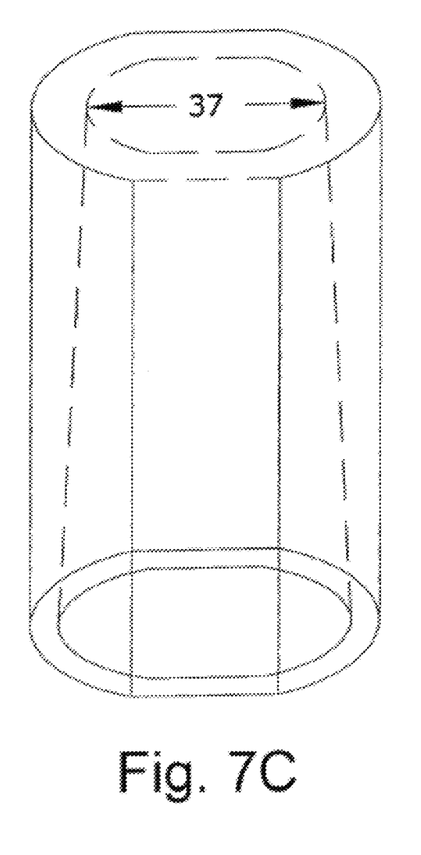

FIG. 7 shows three different preferred cross section widths of the bore 32 of the sleeve 30, depending upon intended use or design preference. The bore may have a uniform cross section width 33 from the first end 34 to the second end 36, a cross section width 35 which narrows from the first end 34 to the second end 36, or a cross section width 37 which widens from the first end 34 to the second end 36.

From the foregoing disclosure and detailed description of certain preferred embodiments, it will be apparent that various modifications, additions and other alternative embodiments are possible without departing from the true scope and spirit of the invention. The embodiments discussed were chosen and described to provide the best illustration of the principles of the invention and its practical application to thereby enable one of ordinary skill in the art to use the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:
1. A cable assembly comprising, in combination:
a cable having a main body, strands, a tail and a first cable end;
an anchor;

a sleeve having a bore, a first end and a second end, wherein the first end is positioned generally adjacent the anchor, and the second end is positioned remote from the anchor, and the cable end is positioned in the bore;

a cured adhesive positioned in the bore, binding the sleeve to the cable; and at least one rope insert at least partially positioned in the bore, wherein the cured adhesive holds the at least one rope insert in a fixed position with respect to the sleeve.

2. The cable assembly of claim 1 wherein strands of the cable at the tail are divided and laid over one another to form a flemish eye, the anchor is the flemish eye, and the first end of the sleeve is generally adjacent the flemish eye.

3. The cable assembly of claim 1 wherein the at least one rope insert extends partially out of the adhesive towards the first end.

4. The cable assembly of claim 1 wherein the cable further comprises one core rope and outer ropes wrapped around the core rope.

5. The cable assembly of claim 1 further comprising a positioning ring positioned in the bore and extending circumferentially around the cable.

6. The cable assembly of claim 1 further comprising a cap having a cap bore with the cable extending through the cap bore, a first end positioned generally adjacent the second end of the sleeve and a second end, wherein the first end of the cap has a cross section width greater than a cross section width of the second end of the cap.

7. The cable assembly of claim 1 wherein the at least one rope insert comprises a stem and a broom, wherein the broom is closer to the first end of the sleeve than the stem.

8. The cable assembly of claim 7 wherein the sleeve has a length and the at least one rope insert has a length which is 35% to 70% the sleeve length.

9. The cable assembly of claim 7 wherein the broom has a broom length and the stem has a stem length which is two to three times the broom length.

10. The cable assembly of claim 1 wherein the at least one rope insert comprises a plurality of rope inserts positioned circumferentially around the cable.

11. The cable assembly of claim 1 wherein the adhesive comprises one of a composite resin and a thermosetting resin.

12. The cable assembly of claim 1 wherein the bore has one of:

a uniform cross section width from the first end to the second end;

a cross section width which narrows from the first end to the second end; and a cross section width which widens from the first end to the second.

13. The cable assembly of claim 1 wherein the main body of the cable has a diameter, and the sleeve has a length which is at least 3.75 times the diameter of the cable.

14. The cable assembly of claim 1 wherein the sleeve has a pair of flats positioned opposite one another such that the bore has a non-circular cross section.

15. The cable assembly of claim 2 wherein the cable further comprises a second tail and a second cable end opposite the first cable end wherein strands of the cable at the second tail are divided and laid over one another to form a second flemish eye and the anchor further comprises the second flemish eye;

a second sleeve having a second bore, a first end and a second end, wherein the first end of the second sleeve is positioned generally adjacent the second flemish eye, and the second end of the second sleeve is positioned remote from the second flemish eye, and the second cable end is positioned in the bore;

cured adhesive positioned in the bore, binding the second sleeve to the cable;

at least one rope insert, wherein the cured adhesive holds the at least one rope insert in a fixed position with respect to the second sleeve; and a second cap having a cap bore with the main body of the cable extending through the cap bore, a first end positioned generally adjacent the second end of the sleeve and a second end.

* * * * *

UNITED STATES PATENT AND TRADEMARK OFFICE
CERTIFICATE OF CORRECTION

| | | |
|---|---|---|
| PATENT NO. | : 8,181,437 B2 | Page 1 of 1 |
| APPLICATION NO. | : 12/623792 | |
| DATED | : May 22, 2012 | |
| INVENTOR(S) | : David Malcolm Glennie and Lew Kah Hoo | |

It is certified that error appears in the above-identified patent and that said Letters Patent is hereby corrected as shown below:

Column 4, line 6 – Replace "been to found to" with --been found to--

Column 4, line 16 – Replace "preferably at" with --is preferably at--

Column 4, line 17 – Replace "FIG. 5." with --FIG. 5).--

Signed and Sealed this
Eighteenth Day of December, 2012

David J. Kappos
*Director of the United States Patent and Trademark Office*